US009672264B2

(12) United States Patent
Poluri et al.

(10) Patent No.: US 9,672,264 B2
(45) Date of Patent: Jun. 6, 2017

(54) METHOD AND SYSTEM FOR BACKUP VERIFICATION (71) Applicant: NETAPP, INC., Sunnyvale, CA (US)

(72) Inventors: Venudhar Poluri, Bangalore (IN); Tarun Mehta, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 345 days.

(21) Appl. No.: 14/605,693

(22) Filed: Jan. 26, 2015

(65) Prior Publication Data

US 2016/0217194 A1 Jul. 28, 2016

(51) Int. Cl.
*G06F 17/00* (2006.01)
*G06F 17/30* (2006.01)
*H04L 29/08* (2006.01)
*G06N 99/00* (2010.01)
*G06F 11/14* (2006.01)

(52) U.S. Cl.
CPC .... *G06F 17/30575* (2013.01); *G06F 11/1451* (2013.01); *G06F 17/30864* (2013.01); *G06N 99/005* (2013.01); *H04L 29/0854* (2013.01)

(58) Field of Classification Search
None
See application file for complete search history.

(56) References Cited

U.S. PATENT DOCUMENTS

| | | | | |
|---|---|---|---|---|
| 6,938,031 B1* | 8/2005 | Zoltan | ............... | G06F 17/30864 707/771 |
| 8,001,307 B1* | 8/2011 | Gole | ............... | G06F 11/2079 707/610 |
| 9,471,091 B2* | 10/2016 | Dally | ............... | G06F 1/12 |
| 2005/0044226 A1* | 2/2005 | McDermott | ............... | G06F 3/0605 709/226 |
| 2006/0101097 A1* | 5/2006 | Barboi | ............... | G06F 11/1471 |
| 2006/0218204 A1* | 9/2006 | Ofer | ............... | G06F 11/202 |
| 2007/0136389 A1* | 6/2007 | Bergant | ............... | G06F 11/1435 |
| 2008/0270596 A1* | 10/2008 | Wahl | ............... | G06F 17/30575 709/224 |
| 2010/0250648 A1* | 9/2010 | Cao | ............... | H04L 67/1002 709/203 |
| 2010/0268991 A1* | 10/2010 | Birch | ............... | G06F 11/2215 714/32 |
| 2011/0099420 A1* | 4/2011 | MacDonald McAlister | ............... | G06F 11/2025 714/6.32 |
| 2012/0284229 A1* | 11/2012 | Kim | ............... | H04L 67/1095 707/634 |
| 2013/0054524 A1* | 2/2013 | Anglin | ............... | G06F 17/30575 707/624 |

(Continued)

*Primary Examiner* — Hung Le (74) *Attorney, Agent, or Firm* — Klein, O'Neill & Singh, LLP (57) ABSTRACT

Systems and methods for performing server replication and verification are disclosed. The method includes replicating data related to a first server and generating metadata for a replicated copy that provides attributes of the replicated copy; storing the metadata at a replication server; providing the metadata from the replication server to a second server to verify that a replication operation has been successful; using the metadata to locate the replicated copy and perform verification at the second server without involving the first server; and storing at the replication server, an indication of the results of the verification performed at the second server.

15 Claims, 6 Drawing Sheets

(56) References Cited

U.S. PATENT DOCUMENTS

| | | | |
|---|---|---|---|
| 2013/0054526 A1* | 2/2013 | Di Vincenzo | G06F 17/30575 707/634 |
| 2014/0025986 A1* | 1/2014 | Kalyanaraman | G06F 11/2028 714/4.11 |
| 2014/0181016 A1* | 6/2014 | Whitehead | G06F 11/00 707/613 |
| 2014/0279912 A1* | 9/2014 | Anglin | G06F 11/1448 707/640 |
| 2014/0281257 A1* | 9/2014 | Hochberg | G06F 3/065 711/135 |
| 2014/0317056 A1* | 10/2014 | Kim | G06F 17/30581 707/634 |
| 2015/0106802 A1* | 4/2015 | Ivanov | G06F 9/45558 718/1 |
| 2015/0112929 A1* | 4/2015 | Quakkelaar | G06F 17/30581 707/615 |
| 2016/0034481 A1* | 2/2016 | Kumarasamy | G06F 17/30088 707/639 |
| 2016/0100004 A1* | 4/2016 | Anglin | H04L 67/1095 709/219 |
| 2016/0154869 A1* | 6/2016 | Cadarette | G06F 17/30575 707/634 |

\* cited by examiner

METHOD AND SYSTEM FOR BACKUP VERIFICATION

TECHNICAL FIELD

The present disclosure relates to storage systems and more particularly, to verification of remote backup operations.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are used by server systems, executing applications such as Exchange and SQL to store and replicate (may also be referred to as "back-up") data. Replication of server data can be a complicated and processing-intensive task. In order to help ensure data reliability, replication tasks often are verified before a replication can be considered reliable, which can strain networked storage systems.

Conventional remote verification processes include the use of two different servers. A first server initiates a backup procedure, which then employs a second server to run a verification process. Throughout the verification process, a connection is held open between the first and second servers, which can degrade performance or result in duplicative processing if a connection is lost for any reason. Additionally, the verification process cannot be completed if the first server goes down. Continuous efforts are being made to improve backup and verification tasks to provide efficient and reliable data replication.

SUMMARY

In one aspect, a machine implemented method is provided. The method includes replicating data related to a first server and generating metadata for a replicated copy that provides attributes of the replicated copy; storing the metadata at a replication server; providing the metadata from the replication server to a second server to verify that a replication operation has been successful; using the metadata to locate the replicated copy and perform verification at the second server without involving the first server; and storing at the replication server, an indication of the results of the verification performed at the second server.

In another aspect, a non-transitory, machine readable storage medium having stored thereon instructions for performing a method is provided. The machine executable code which when executed by at least one machine, causes the machine to: replicate data related to a first server and generating metadata for a replicated copy that provides attributes of the replicated copy; store the metadata at a replication server; provide the metadata from the replication server to a second server to verify that a replication operation has been successful; use the metadata to locate the replicated copy and perform verification at the second server without involving the first server; and store at the replication server, an indication of the results of the verification performed at the second server.

In yet another aspect, a system having a memory with machine readable medium comprising machine executable code having stored thereon instructions is provided. A processor module coupled to the memory is configured to execute the machine executable code to: replicate data related to a first server and generating metadata for a replicated copy that provides attributes of the replicated copy; store the metadata at a replication server; provide the metadata from the replication server to a second server to verify that a replication operation has been successful; use the metadata to locate the replicated copy and perform verification at the second server without involving the first server; and store at the replication server, an indication of the results of the verification performed at the second server.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to computer-related entities, such as software-executing general purpose processors, hardware, firmware, and/or combinations thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Improved methods and systems for handling replication (may also be referred to as back-up) verification requests are provided. In one aspect, replication verification requests are managed by a centralized replication server and directed to target machines (or server systems) for verification without having to use source machines in the verification process. In one aspect, the target machines may retrieve data for verification from a centralized replication server. In one aspect, the results can be reported bypassing source machines as well. In this manner, source machine replications can be verified without placing any burden on the source machine or the source machine even needing to be online.

In another aspect, a procedure for cloning a server is provided that uses metadata stored on a centralized replication server to allow a target machine to clone a source machine without actually communicating with the source machine.

Figure 1A:
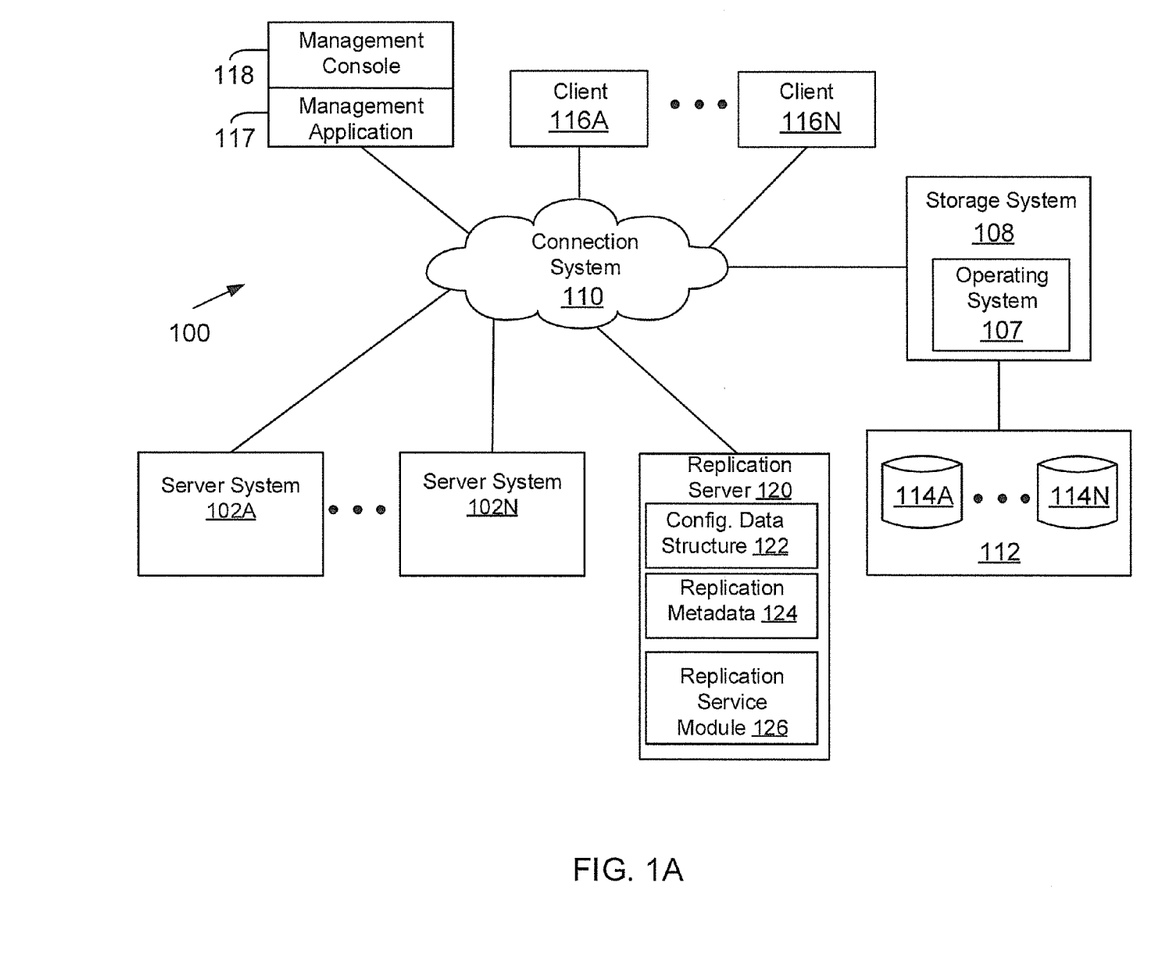
FIG. 1A shows an example of a storage operating environment for the various aspects disclosed herein.

System 100:

FIG. 1A shows an example of a system 100, where the adaptive aspects disclosed herein may be implemented. In one aspect, system 100 includes a plurality of servers 102A-102N (may also be referred to as server system 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

System 100 may also include a management console 118 that executes processor executable instructions, for example, a management application 117 for managing and configuring various elements of system 100. For example, a management application 117 may be used to set up replication (or backup) scheduling for various server systems 102A-102N as well as assigning verification duties to server systems when others are replicating data. In one aspect, the management application 117 may comprise a web browser for accessing a web-based replication scheduling application, for example. In such an aspect, a portion of management application 117 may reside on, or access another module on, for example, a replication server 120 described below in detail.

One or more client computing systems 116A-116N (may also be referred to as client system 116) may also be provided for generating input/output requests for reading and writing information or for any other reason. As an example, client system 116 may be a computing terminal that uses one or more of server systems 102A-102N and/or storage system 108. In one aspect, client systems 116A-116N may also be used to access management and scheduling features through management console 118 and/or replication server 120.

Server system 102, replication server 120, management console 118 and client system 116 may be general purpose computers having a plurality of components. As described below in more detail, these components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

In one aspect, the storage system 108 has access to a set of mass storage devices 114a-114n (may be referred to as storage devices 114) within at least one storage subsystem 112. The mass storage devices 114 may include writable storage device media such as magnetic disks, video tape, optical, DVD, magnetic tape, and/or non-volatile memory devices, such as, for example, hard drives (HDDs), solid state drives (SSDs), hybrid drives (sometimes referred to as SSHDs), self-encrypting drives, flash memory devices and any other similar media adapted to store information. The storage devices 114a-114n may be organized as one or more groups of Redundant Array of Independent (or Inexpensive) Disks (RAID). The aspects disclosed are not limited to any particular storage device or storage device configuration.

The storage system 108 provides a set of storage volumes to the server systems 102 via connection system 110. The storage operating system 107 can present or export data stored at storage devices 110 as a volume, or one or more qtree sub-volume units. Each volume may be configured to store data files (or data containers or data objects), scripts, word processing documents, executable programs, and any other type of structured or unstructured data. From the perspective of one of the client systems, each volume can appear to be a single disk drive. However, each volume can represent the storage space in one disk, an aggregate of some or all of the storage space in multiple disks, a RAID group, or any other suitable set of storage space.

The storage devices or storage space at storage devices 114 may be presented as a "logical unit number" (LUN) where a LUN may refer to a logical data container that looks like a storage device to a server system but which actually may be distributed across multiple storage devices by storage system 108.

It is noteworthy that the term "disk" as used herein is intended to mean any storage device/space and not to limit the adaptive aspects to any particular type of storage device, for example, hard disks.

The storage system 108 may be used to store and manage information at storage devices 114 based on a request generated by a management console 118 and/or server system 102A-102N. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, server system 102 transmits one or more input/output (I/O) commands, such as an NFS or CIFS request, over connection system 110 to the storage system 108. Storage system 108 receives the request, issues one or more I/O commands to storage devices 114 to read or write the data on behalf of the server system, and issues an NFS or CIFS response containing the requested data over the network 110 to the server system.

Although storage system 108 is shown as a stand-alone system, i.e. a non-cluster based system, in another aspect, storage system 108 may have a distributed architecture; for example, a cluster based system that may include a separate N-("network") blade and D-(disk) blade. Briefly, the N-blade is used to communicate with server system 102, while the D-blade is used to communicate with the storage devices 114 that are a part of a storage sub-system. The N-blade and D-blade may communicate with each other using an internal protocol.

Alternatively, storage system 108 may have an integrated architecture, where the network and data components are all contained in a single box. The storage system 108 further may be coupled through a switching fabric to other similar storage systems (not shown) which have their own local storage subsystems. In this way, all of the storage subsystems can form a single storage pool, to which any client of any of the storage servers has access.

Information stored at server systems 102A-102N and/or storage system 108 is typically backed-up (or replicated) at one or more storage locations within storage system 108. A backup of a file or a file system includes copying and storage of a directory and/or tree structure of the file system. A processor executable backup process may use image taking technology (e.g., the Snapshot™ technology provided by NetApp® Inc. of Sunnyvale, Calif.) (without derogation of trademark rights of NetApp® Inc.) to backup all or a portion of the file system. The image(s) can be used later during a restore process.

A snapshot is a persistent point in time (PPT) image of the active file system that enables quick recovery of data after data has been corrupted, lost, or altered. Snapshots can be created by copying the data at each predetermined point in time to form a consistent image. The terms snapshot, replication and backup are used interchangeably throughout this specification. It is noteworthy that the adaptive aspects described herein are not limited to using any particular imaging technology.

In some aspects, the replication process produces replicated information that may include metadata that is stored by server systems 102A-102N. The metadata includes information describing the snapshot performed on the file system (e.g., a time stamp, filenames, and/or location information). The metadata information and images are used later to verify a replication operation as described below in detail.

In one aspect, system 100 further includes the replication server 120 that can be used to manage replication, verification, and other replication processes. The structure of the replication server 120 may be similar to server 102 that is described below in detail. In another aspect, replication server 120 may be implemented as a virtual machine server in a virtual machine environment.

In one aspect, replication server 120 includes or stores a configuration data structure 122, replication metadata 124, and a replication service module 126. The replication service module 126 may be implemented in hardware or computer-executable instructions that are executed by a hardware based processor out of a memory.

Configuration data structure 122 includes, for example, data regarding system 100 and the server systems 102A-102N. In one aspect, the configuration data structure includes information such as defining which server system 102x will act as the verification server for a given server system 102y and its replication procedures. In one aspect, each server system 102x that performs replication operations generates metadata as described above which may be stored locally for each server system 102x. Further this data is stored by replication server 120 as replication metadata 124. The replication service module 126 interfaces with server systems 102x to help manage and process replication requests, verification processes, and other replication processes.

Server System 102:

Before describing the various aspects of the present disclosure in detail, the following provides a brief description of server system 102. Note, certain standard components used by server system 102 that are not germane to the aspects disclosed herein have not been described.

Figure 1B:
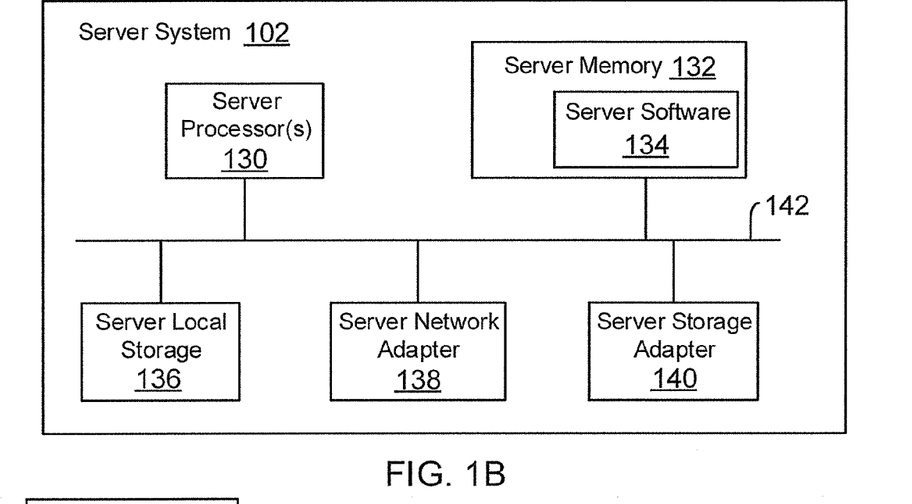
FIGS. 1B-1C show examples of a server system, according to the various aspects of the present disclosure.

The server system 102 comprises server processor(s) 130, a server memory 132, a server local storage 136, a server network adapter 138, and a server storage adapter 140, coupled by a bus system 142. The bus system 142 is an abstraction that represents any one or more separate physical buses and/or point-to-point connections, connected by appropriate bridges, adapters and/or controllers. The bus system 142, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The server processors 130 are the central processing units (CPUs) of the server system 102 and, thus, control the overall operation of the server system 102. In certain aspects, the server processors 130 accomplish this by executing programmable instructions out of server memory 132. The server processors 130 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The server memory 132 comprises storage locations that are addressable by the processor 130 and adapters, for example, the server network adapter 138 and the server storage adapter 140. The storage locations are for storing executable instructions that preferably include server software 134. The server processor 130 and the server adapters may, in turn, comprise processing elements and/or logic circuitry configured to execute the programmable code and manipulate various data structures. Server software 134 may include an operating system and/or server applications, such as web server applications, database applications, and the like.

The server memory 132 can be a random access memory (RAM), a read-only memory (ROM), or the like, or a combination of such devices. It will be apparent to those skilled in the art that other processing and memory means, including various computer readable media, may be used for storing and executing program instructions pertaining to the aspects described herein.

The server network adapter 138 comprises a plurality of ports adapted to couple the server system 102 to one or more client systems 116 (shown in FIG. 1A) over point-to-point links, wide area networks, virtual private networks implemented over a public network (Internet), a shared local area network, or the like. The server network adapter 138 thus may comprise the mechanical, electrical and signaling circuitry needed to connect the server system 102 to the network.

The server storage adapter 140 facilitates access to the storage devices 114 (shown in FIG. 1A). The server storage adapter 140 comprises a plurality of ports having input/output (I/O) interface circuitry that couples to the devices 110 over an I/O interconnect arrangement, such as a conventional high-performance, Fibre Channel (FC) link topology.

In one aspect, server network adapter 138 and server storage adapter 140 may be integrated into a single converged adapter that can handle both network and storage traffic. An example of such a converged adapter is a Fibre Channel over Ethernet (FCOE) adapter.

The server system 102 also has access to local storage 136 which comprises one or more mass storage devices that may store information within the server system 102, such as executable instructions 134 (also referred to as server software 134), the server operating system, and/or data. The server system 102 loads server software 134 into the server memory 132 from which they are accessed by the server processors 130. The server local storage 136 may be or may include any conventional medium for storing large volumes of data in a non-volatile manner, such as one or more magnetic or optical based disks, flash memory, HDD(s), SSD(s), SSHD(s), and other types of storage devices.

Figure 1C:
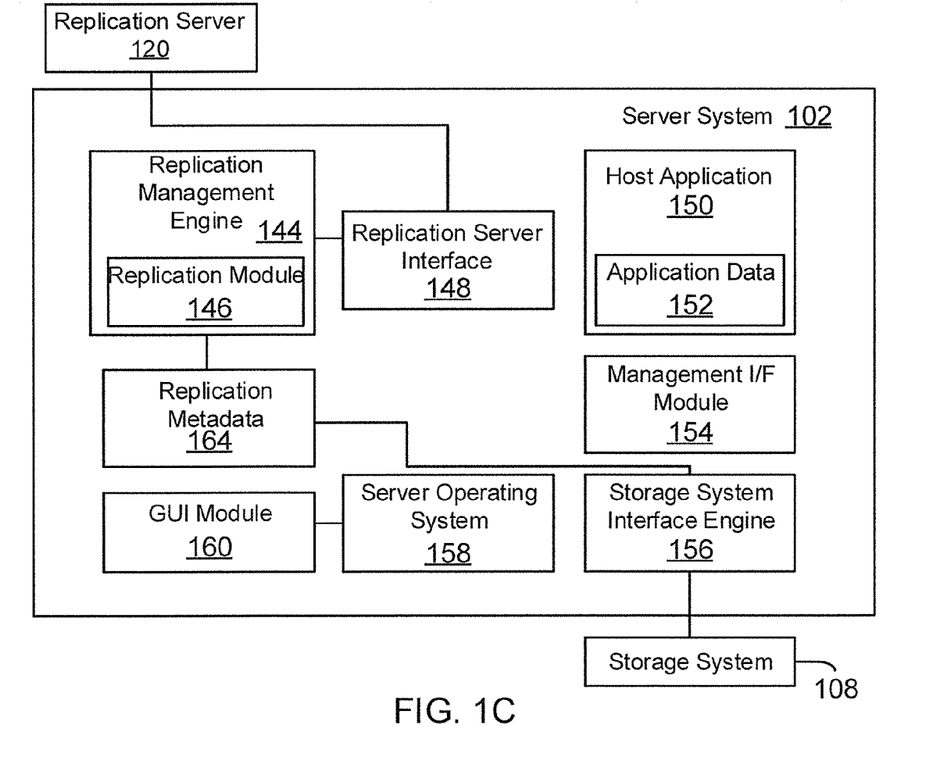

FIG. 1C shows an example of an architecture used by the server system 102 of FIG. 1B. In some aspects, the server system 102 executes a server operating system 158; a management interface module 154; one or more host application(s) 150, which may use application data 152 (or a database 152); a replication management engine 144 having or interfacing with a replication module 146; a graphical user interface (GUI) module 160; a replication server interface 148; and a storage system interface engine 156.

The server operating system 158 includes executable instructions that are executed out of server memory 132 for managing host applications 150 and other operations. The server operating system 158 can include, for example, UNIX®, Windows NT®, Linux®, or any other operating system.

Operating system 158 interfaces with or includes the management interface module 154. In one aspect, management interface module 154 may include a Windows Management Instrumentation (WMI) module that maintains information regarding various components of server system 102.

The host application(s) 150 can be any application used for servicing client 102 requests. Host applications 150 may include, for example, an email server application, a database management application, a web or file server application, and/or other applications.

The storage system interface engine 156 may be configured to act as an interface between the server system 102 and the storage system 108. Host applications 150 and/or server operating system 158 may be configured to store data with the storage system in addition to or in the alternative to storing data at server local storage 136. The storage system interface engine 156 communicates with the storage system 108 by using, for example, a Zephyr Application and Programming Interface (ZAPI) protocol.

In some aspects, the storage system interface engine 156 includes SnapDrive® (without derogation of trademark rights of NetApp Inc.), a program provided by NetApp Inc. of Sunnyvale, Calif. for interfacing with SnapManager® and the storage operating system 107. It is noteworthy that the adaptive aspects described herein are not limited to using SnapDrive®, any other module may be used for interfacing with the storage operating system.

In particular, the storage system interface engine 156 interacts with the replication management engine 144 to receive and perform requests made by the replication management engine 144 by interacting with host applications 150 of the server system 102 and the storage system 108. For example, a replication task may be for a database host application 150. In order to replicate the database, the replication management engine 144 interfaces with the database host application 150 to determine, for example, the size of the database, how the database data is set up, and where the database data is stored (these parameters may be determined through application data 152). As much, if not all, of the database may be stored in storage system 108, the storage system interface engine 156 is then employed to communicate with storage system 108 and carry out a replication task, such as a back-up. The replication management engine 144 may also interface with the replication server interface 148 to communicate with the replication server 120. For example, in one aspect, server system 102 may pass replication metadata 164 to replication server 120 for storage and handling of tasks, such as verification.

In one aspect, information stored in storage devices 114 and managed by storage system 108 may be replicated by the replication management engine 144. Typically, information stored in storage devices 114 will relate to one or more host applications 150 resident on the server system 102, such as an exchange application or a database application. The replication management engine 144 using replication module 146 may initiate a replication of a file and/or file system e.g., by sending a command to the storage system 108 via the storage system user interface engine 156. In one aspect, the command may be dependent, at least in part, on either the host application 150 to which the data relates or more specifically to application data 152 that identifies the location and arrangement of the data in the storage devices 114, for example. The storage operating system 107 (shown in FIG. 1A) of storage system 108 generates one or more images relating to the file system to replicate all or a portion of the file system e.g., a single file, multiple files, a drive, a disk, multiple drives or disks, and/or one or more volumes including multiple drives.

For each replication, the replication management engine 144 may also cause the storage system 108 to generate replication metadata information that is stored as replication metadata 164. The replication metadata 164 may include information about a replication, for example, identification for the replication, a time stamp when the replication was performed, and filenames, directory locations on the storage device(s) 114, and/or the directory path where snapshots are stored. The replication metadata 164 may be used later to restore the file system and/or portions thereof, for instance, in case of a system crash, data corruption, virus, or a similar occurrence.

In some aspects, the replication management engine module 146 uses the image taking technology (e.g., Snapshot™ technology provided by NetApp® Inc. of Sunnyvale, Calif.) to replicate all or a portion of the file system. In some aspects, the replication module 146 includes SnapManager®, (without derogation of trademark rights of NetApp Inc.) a program provided by NetApp® Inc. of Sunnyvale, Calif. to take snapshots.

Server system 102 further includes the replication server interface 148 that may provide communication with replication server 120 to aid replication management engine 144 in performing replication related tasks, such as back-ups, imaging, validation, and restore tasks. In one aspect, replication server interface 148 communicates replication metadata 164 to replication server 120 which maintains a copy in case server system 102 goes down, loses data, or otherwise has a problem.

In another aspect, a server system 102x may operate as a validation server with respect to the replication task of another server system 102y. In such an instance, the replication server 120 may provide replication metadata related to the server system 102y which server system 102x accepts through its replication server interface 148. The replication management engine 144 and/or replication module 146 may then use the received data to verify server system 102y's replication, which is then reported back to replication server 120.

After the replication is performed, the storage operating system 107 notifies the replication management engine 144 that the replication operation is completed. In some aspects, the storage operating system 107 may alternatively or additionally notify replication server 120 that the replication is completed. The server system 102, in one aspect, may communicate the completion of a replication operation to replication server 120 through replication server interface 148. In some aspects, as described above, a restore operation is later performed by using the generated images, and/or the replication metadata 164.

Figure 1D:
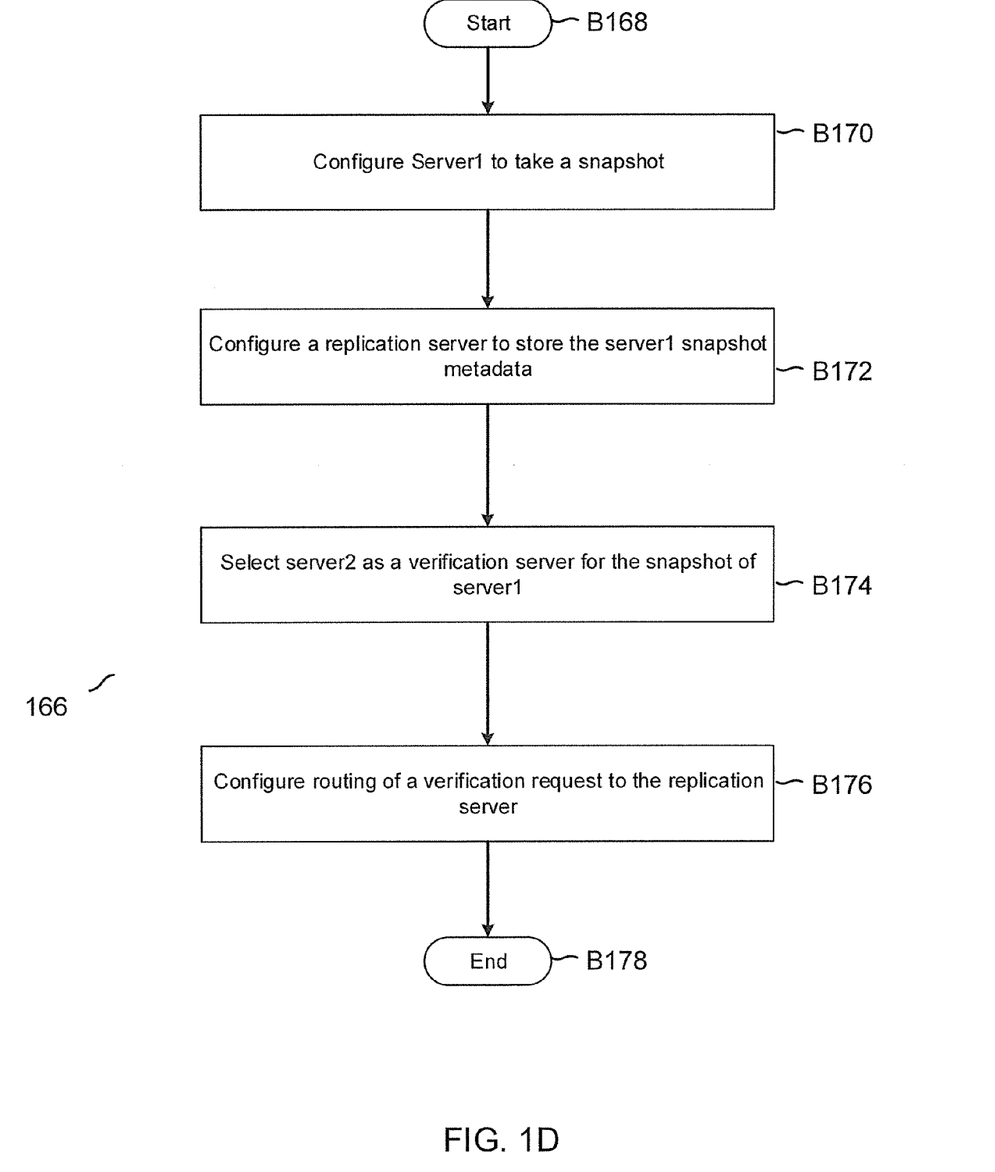
FIGS. 1D-1E show process flow diagrams, according to the various aspects of the present disclosure.

Process Flow:

Interactions of the foregoing components, according to the various aspects of this disclosure, will now be described in more detail with respect to the flow diagrams of FIGS. 1D and 1E. FIG. 1D illustrates an example of a system configuration process 166. Starting at B168, a system comprising the replication server 120, at least two server systems 102 (Server1 and Server2), and the storage system 108 are operational. At block B170, a first server (for example, Server1) is configured to perform a replication operation, for example, for taking a snapshot of an Exchange database, as SQL database, or any other data container. In one aspect, management console 118 running management application 117 may be used to configure replications at given time intervals, for example.

At block B172, the replication server 120 is configured to store the Server1 replication metadata. At block B174, Server2 is selected as a verification server for the replication operation (snapshot) of Server1.

At block B176, a routing is configured for a verification request. Importantly, this routing bypasses Server1, so that Server1 is not burdened with any aspect of the verification process. At block B178, the process exits.

In one aspect, these steps are performed by replication server 120, which tracks the server systems 102 that are performing replication tasks and which server systems 102 can be or are utilized for verification checks corresponding to those replication tasks. The replication server 120 further stores copies of replication metadata that can be used so that server systems performing verification checks can do so without communicating with the original replication server system 102.

Figure 1E:
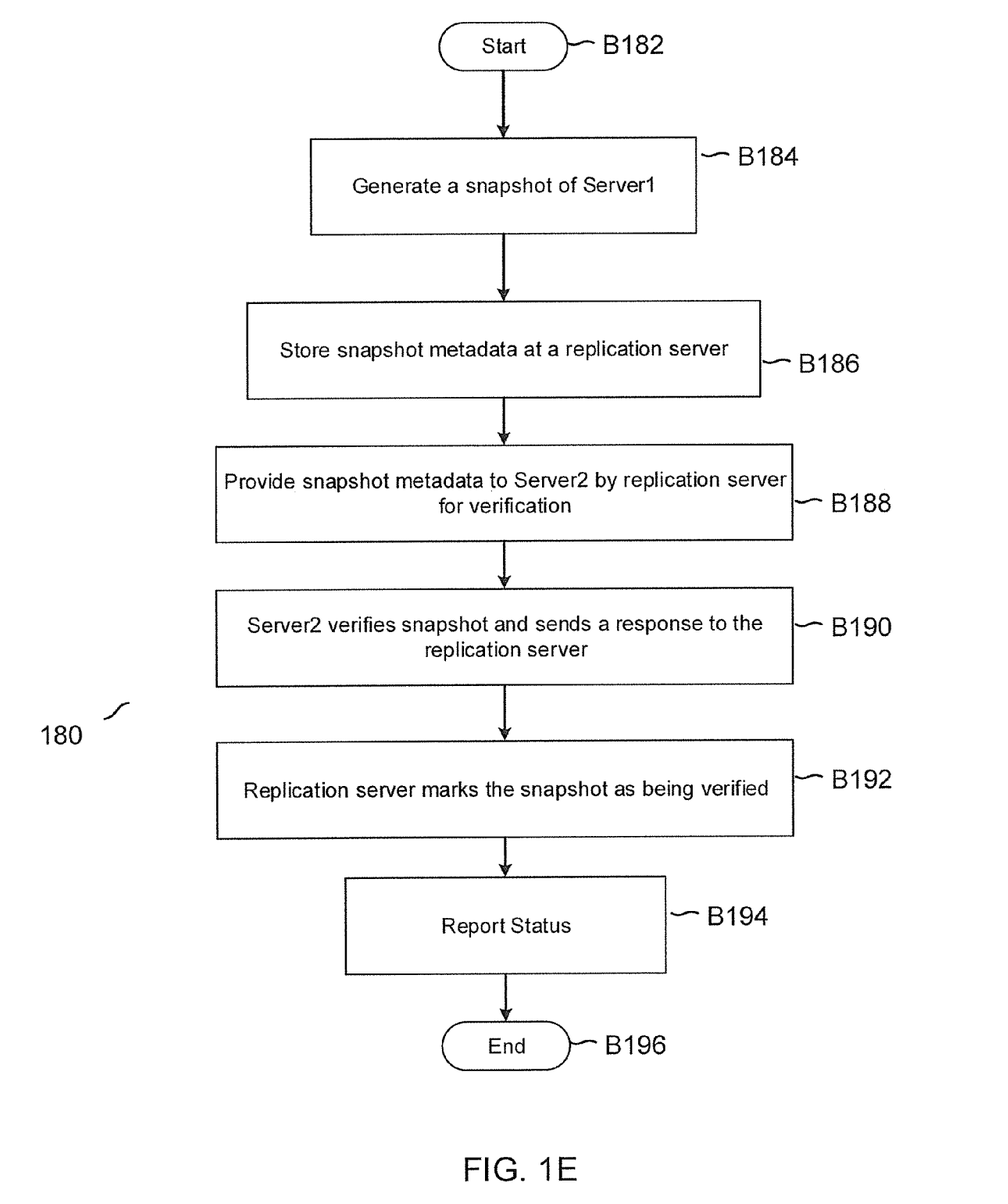

Turning to FIG. 1E, an example replication and verification process 180, according to one aspect, is described. The replication and verification process 180 starts at block B182.

At block B184, Server1 (a server system 102x) causes a snapshot to be generated of data related to one or more host applications 150 for replication purposes. The data may reside on server system 102 and/or storage system 108. When the data resides on storage system 108, storage operating system 107 may actually carry out the replication/snapshot. The snapshot data will generally be stored on the storage system 108 or, more specifically, one or more of the storage devices 114a-n. The snapshot process generally returns metadata about the snapshot to Server1 to be stored as replication metadata 164. This metadata is also stored at the replication server 120 at block B186.

At block 5188, the replication server 120 initiates a replication verification process of the Server1 snapshot by sending the replication metadata to a second server system 102, Server2. Server2 then uses the replication metadata to load the snapshot from the storage system 108, perform the verification, and send a verification result to the replication server 120 at block B190. In part, according to one aspect, this verification process may include restoring or recreating a database that is the subject of a snapshot and a database consistency check (DBCC).

It is noteworthy that this verification can be accomplished using communication between replication server 120 and Server2 without involving Server1, which is then free to process other tasks. In one aspect, for example, this allows production servers to be freed of verification burdens while allowing these tasks to be handled by test servers or the like. It should be understood that storage objects other than a database similarly may be the subject of snapshots and verification as described herein. For example, storage objects may include databases, other data containers, storage volumes, drive partitions, full drives, and the like.

At block B192, the replication server 120 marks the snapshot as being verified, if the snapshot was verified by Server2, or it can record an error to have the snapshot invalidated or rerun if needed. At block B192, this status can then be reported to interested client systems 116, to management console 118, to Server 1, or the like. At block B196, the process ends.

Figure 2:
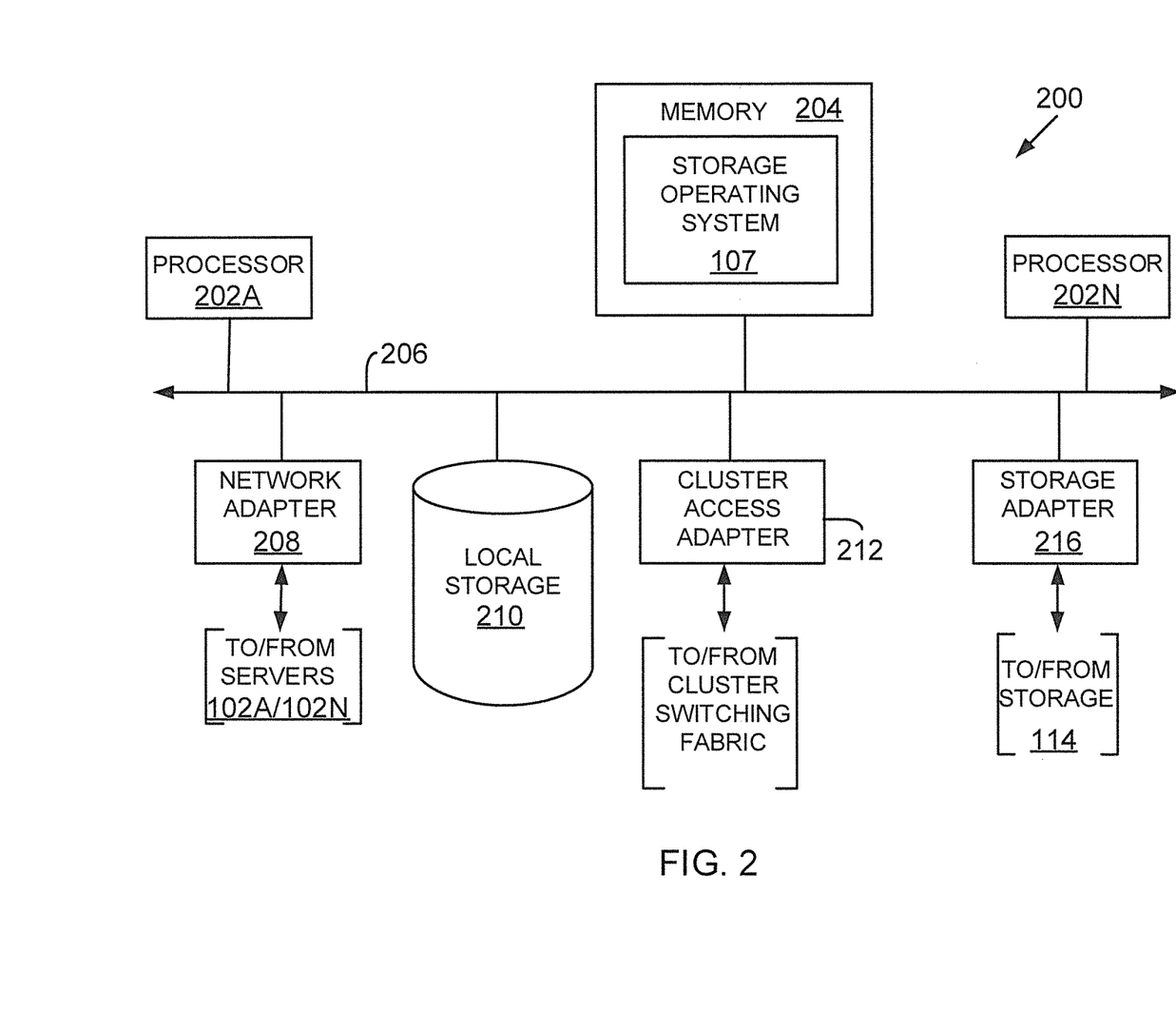
FIG. 2 shows an example of a storage system, used according to one aspect of the present disclosure.

Storage System:

FIG. 2 is a block diagram of a system 200, according to one aspect. System 200 may be used by a stand-alone storage system 108 and/or a storage system node operating within a cluster. System 200 interfaces with the storage system interface 156 to replicate server systems and their associated data, as described above.

System 200 may include a plurality of processors 202A-202N, a memory 204, a network adapter 208, a cluster access adapter 212 (used for a cluster environment), a storage adapter 216 and local storage 210 interconnected by a system bus 206. The bus 206 is an abstraction that represents any one or more separate physical buses and/or point-to-point connections, connected by appropriate bridges, adapters and/or controllers, similar to that described above with respect to bus 142 of FIG. 1B. The local storage 210 comprises one or more storage devices, such as disks, utilized by the processors to locally store configuration and other information.

The cluster access adapter 212 comprises a plurality of ports adapted to couple system 200 to other nodes of a cluster (not shown). In the illustrative aspect, Ethernet may be used as the clustering protocol and interconnect media, although it will be apparent to those skilled in the art that other types of protocols and interconnects may be utilized within the cluster architecture described herein.

System 200 is illustratively embodied as a dual processor storage system executing a storage operating system 107 that preferably implements a high-level module, such as a file system, to logically organize information as a hierarchical structure of named directories and files and special on storage devices 114. However, it will be apparent to those of ordinary skill in the art that the system 200 may alternatively comprise a single or more than two processor systems.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 107, portions of which are typically resident in memory and executed by the processing elements, functionally organizes the system 200 by, inter alia, invoking storage operations in support of the storage service provided by storage system 108. An example of operating system 107 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be used in accordance with the inventive principles described herein. As such, where the term "ONTAP" is employed, it should be taken broadly to refer to any storage operating system that is otherwise adaptable to the teachings of this invention.

The network adapter 208 comprises a plurality of ports adapted to couple the system 200 to one or more server systems 102A-102N over point-to-point links, wide area networks, virtual private networks implemented over a public network (Internet) or a shared local area network. The network adapter 208 thus may comprise the mechanical, electrical and signaling circuitry needed to connect storage system 108 to the network.

The storage adapter 216 cooperates with the storage operating system 107 executing on the system 200 to access information requested by the servers and management application 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 216 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
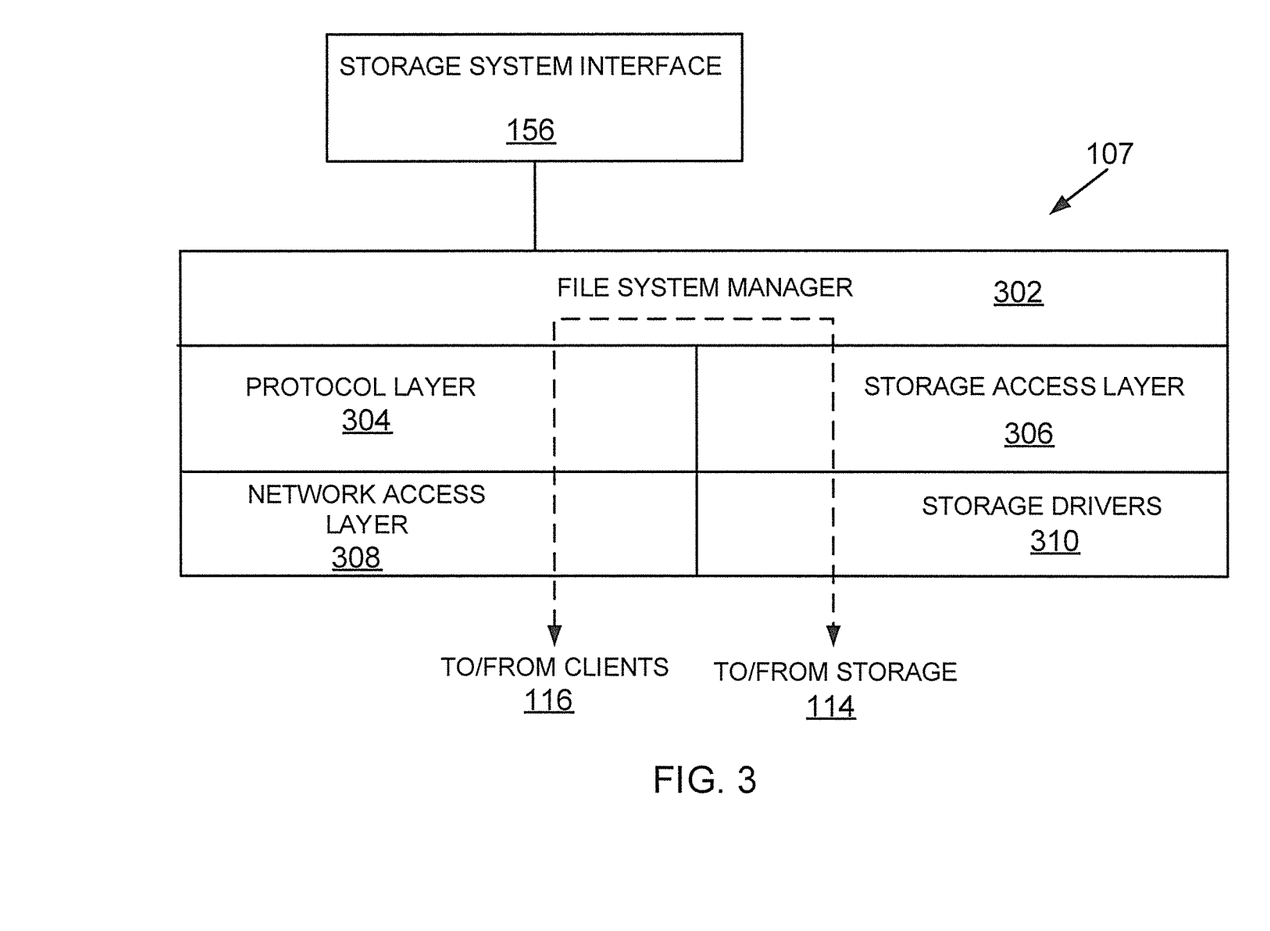
FIG. 3 shows an example of a storage operating system, used according to one aspect of the present disclosure.

Operating System:

FIG. 3 illustrates a generic example of operating system 107 executed by storage system 108, according to one aspect of the present disclosure. Storage operating system 107 interfaces with storage system interface engine 156 to process replication tasks from server systems 102. For example, server system 102A may act as a primary server for a database system and may request that the database be replicated by communicating with the storage system 108 through storage system interface engine 156. The storage operating system 107 may carry out a replication process to replicate the database data stored in storage system 108 and provide replication metadata 164 about the snapshot to server system 102 through the storage system interface engine 156.

As an example, operating system 107 may include several modules, or "layers." These layers include a file system manager 302 that keeps track of a directory structure (hierarchy) of the data stored in storage devices and manages read/write operations, i.e. executes read/write operations on disks in response to I/O requests.

Operating system 107 may also include a protocol layer 304 and an associated network access layer 308, to allow system 200 to communicate over a network with other systems, such as server system 102 and management console 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between server systems 102 and mass storage devices 114 are illustrated schematically as a path, which illustrates the flow of data through operating system 107.

The operating system 107 may also include a storage access layer 306 and an associated storage driver layer 310 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108 in response to a file system request.

As used herein, the term "storage operating system" generally refers to the computer-executable code operable on a computer to perform a storage function that manages data access and may, in the case of system 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud"

is intended to refer to any network (including the Internet) for providing computers as a shared resource.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The replication server and the storage systems described above can be a part of the server layer for providing storage services. Details regarding these layers are not germane to the inventive aspects.

Thus, a method and apparatus for replication and verification for server systems have been disclosed. Note that references throughout this specification to "an aspect" or "one aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the invention, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims. For example, in an aspect, a replication server 120 may further operate as a validation server system 102. In such a case, one server system 102 can initiate a back-up/replication process which can then be verified by replication server 120, which can also store the replication metadata and verification results as generally described herein.

What is claimed is:

1. A machine implemented method, comprising:
   replicating data related to a first server and generating metadata for a replicated copy that provides attributes of the replicated copy; wherein the replicated copy comprises a point in time copy of a storage object;
   storing the metadata at a replication server;
   providing the metadata from the replication server to a second server to verify that a replication operation has been successful;
   using the metadata to locate the replicated copy and perform verification at the second server without involving the first server; wherein the verification comprises: the second server mounting the point-in-time copy; and the second server testing the point-in-time copy; and
   storing, on the replication server, an indication of the results of the verification performed at the second server.

2. The machine implemented method of claim 1, further comprising reporting results of the verification by the replication server.

3. The machine implemented method of claim 2, wherein the results are provided to the first server and the method further comprises creating a second replication copy based on the results provided to the first server.

4. The machine implemented method of claim 1, wherein testing the point-in-time copy comprises:
   the second server recreating the storage object; and
   the second server verifying integrity of the recreated storage object.

5. The machine implemented method of claim 1, wherein the verification comprises performing a database consistency check (DBCC).

6. A non-transitory, machine readable storage medium having stored thereon instructions for performing a method, comprising machine executable code which when executed by at least one machine, causes the machine to:
   replicate data related to a first server and generating metadata for a replicated copy that provides attributes of the replicated copy; wherein the replicated copy comprises a point in time copy of a storage object;
   store the metadata at a replication server;
   provide the metadata from the replication server to a second server to verify that a replication operation has been successful;
   use the metadata to locate the replicated copy and perform verification at the second server without involving the first server; wherein the verification comprises: the second server mounting the point-in-time copy; and the second server testing the point-in-time copy; and
   store at the replication server, an indication of the results of the verification performed at the second server.

7. The machine readable storage medium of claim 6, further comprising code to report results of the verification by the replication server.

8. The machine readable storage medium of claim 7, wherein the results are provided to the first server and the method further comprises creating a second replication copy based on the results provided to the first server.

9. The machine readable storage medium of claim 6, wherein testing the point-in-time copy comprises:
   the second server recreating the storage object; and
   the second server verifying integrity of the recreated storage object.

10. The machine readable storage medium of claim 6, wherein the verification comprises performing a database consistency check (DBCC).

11. A system, comprising:
    a memory containing machine readable medium comprising machine executable code having stored thereon instructions; and a processor module coupled to the memory, the processor module configured to execute the machine executable code to:
    replicate data related to a first server and generating metadata for a replicated copy that provides attributes of the replicated copy; wherein the replicated copy comprises a point in time copy of a storage object;
    store the metadata at a replication server;
    provide the metadata from the replication server to a second server to verify that a replication operation has been successful;
    use the metadata to locate the replicated copy and perform verification at the second server without involving the first server; wherein the verification comprises: the second server mounting the point-in-time copy; and the second server testing the point-in-time copy; and store at the replication server, an indication of the results of the verification performed at the second server.

12. The system of claim 11, further comprising machine executable code to report results of the verification by the replication server.

13. The system of claim 12, wherein the results are provided to the first server and the method further comprises creating a second replication copy based on the results provided to the first server.

14. The system of claim 11, wherein testing the point-in-time copy comprises:
   the second server recreating the storage object; and
   the second server verifying integrity of the recreated storage object.

15. The system of claim 11, wherein the verification further comprises performing a database consistency check (DBCC).

* * * * *